United States Patent
Koga et al.

(10) Patent No.: US 7,526,044 B2
(45) Date of Patent: Apr. 28, 2009

(54) TRANSMITTER AND METHOD FOR DIGITAL MULTI-CARRIER TRANSMISSION

(75) Inventors: Hisao Koga, Chikushi-gun (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 574 days.

(21) Appl. No.: 10/883,010

(22) Filed: Jul. 2, 2004

(65) Prior Publication Data

US 2005/0031048 A1 Feb. 10, 2005

(30) Foreign Application Priority Data

Jul. 3, 2003 (JP) ............... P. 2003-190953

(51) Int. Cl.
 *H04L 27/00* (2006.01)
(52) U.S. Cl. ............... 375/295
(58) Field of Classification Search ........... 375/295, 375/222, 259, 260
 See application file for complete search history.

(56) References Cited

U.S. PATENT DOCUMENTS

| | | | | |
|---|---|---|---|---|
| 6,434,119 | B1 * | 8/2002 | Wiese et al. | 370/252 |
| 6,442,129 | B1 | 8/2002 | Yonge, III et al. | |
| 6,442,149 | B1 | 8/2002 | Nakano et al. | |
| 6,473,409 | B1 | 10/2002 | Malvar | |
| 6,487,574 | B1 | 11/2002 | Malvar | |
| 6,496,795 | B1 | 12/2002 | Malvar | |
| 6,792,092 | B1 * | 9/2004 | Michalewicz | 379/202.01 |
| 6,952,441 | B2 | 10/2005 | Peeters | |
| 2002/0027918 | A1 * | 3/2002 | Burmeister et al. | 370/394 |
| 2004/0047284 | A1 * | 3/2004 | Eidson | 370/203 |
| 2004/0120592 | A1 * | 6/2004 | Fernandes | 382/240 |

FOREIGN PATENT DOCUMENTS

| | | |
|---|---|---|
| JP | 11252031 | 9/1999 |
| JP | 11275165 | 10/1999 |
| JP | 2001298439 | 10/2001 |

OTHER PUBLICATIONS

Japanese Office Action dated Nov. 22, 2006 with English translation.
J. Alhava, et al., "Adaptive Sine-Modulated/Cosine-Modulated Filter Bank Equalizer for Transmultiplexers," European Conference on Circuit Theory and Design, Espoo, Finland, Aug. 28-31, 2001, pp. 337-340.
A. Viholainen, et al., "Implementation of Parallel Cosine and Sine Modulated Filter Banks for Equalized Transmultiplexer Systems," Telecommunications Laboratory, Tampere University of Technology, Tampere, Finland, IEEE, 2001, pp. 3625-2628.

(Continued)

*Primary Examiner*—Kevin M Burd
(74) *Attorney, Agent, or Firm*—Dickinson Wright, PLLC

(57) ABSTRACT

The present invention relates to a transmitter and method employing a multi-carrier transmission method, especially utilizing real coefficient wavelet filter banks. The transmitter includes a preamble data generator, a modulator, and a ramp processor. The preamble data generator generates preamble bit data, and outputs the preamble data. The modulator modulates the preamble data, generates a plurality of subcarriers, and outputs a composite wave of the time waves of the plurality of subcarriers. Subsequently, the ramp processor performs ramp processing on the composite wave with a certain delay period from a reference position of the composite wave.

25 Claims, 14 Drawing Sheets

OTHER PUBLICATIONS

A. Viholainen, et al., "Complex Modulated Critically Sampled Filter Banks Based on Cosine and Sine Modulation," Institute of Communications Engineering, Tampere University of Technology, Tampere, Finland, IEEE, 2002, pp. 833-836.

J. Alhava, et al., "Exponentially-Modulated Filter Bank-Based Transmultiplexer," Tampere University of Technology, Institute of Communications Engineering, Tampere, Finland, IEEE, 2003, pp. 233-236.

J. Alhava, et al., "Efficient Implementation of Complex Exponentially-Modulated Filter Banks," Tampere University of Technology, Institute of Communications Engineering, Tampere, Finland, 2003, pp. 157-160.

Y. Yang, et al., "DSP Implementation of Low-Complexity Equalizer for Multicarrier Systems," Institute of Communications Engineering, Tampere University of Technology, IEEE, 2003, pp. 271-274.

A. Viholainen, et al., "Alternative Subband Signal Structures for Complex Modulated Filter Banks with Perfect Reconstruction," Institute of Communications Engineering, Tampere University of Technology, Tampere, Finland, IEEE, 2004, pp. 525-528.

M. C. Sun, et al., "Power-Line Communication using DWMT Modulation," 2002 IEEE International Symposium on Circuits and Systems, vol. 4, XP002271367, pp. 493-496, May 26-29, 2002.

International Search Report dated Oct. 19, 2005.

Cheong K-W et al.: "Discrete Wavelet Transforms in Multi-Carrier Modulation" IEEE Globecom 1998, The Bridge to Global Integration, Sydney, Nov. 8-12, 1998, IEEE Global Telecommunications Conference, New York, vol. 5, 1998, pp. 2794-2799, XP000801553, ISBN: 0-7803-4985-7.

Chang M-C et al.: "Dynamic Water-Filling for Wavelet Communications" VTC 2001 Spring, IEEE VTS 53$^{rd}$, Vehicular Technology Conference, Rhodes, Greece, May 6-9, 2001, vol. 2 of 4, Conf. 53, pp. 1254-1258, XP001067163, ISBN: 0-7803-6728-6.

Maivar, Henrique, "Signal Processing with Lapped Transforms," ISBN 089006-467-9, pp. 204-219, 1992.

* cited by examiner

TRANSMITTER AND METHOD FOR DIGITAL MULTI-CARRIER TRANSMISSION

BACKGROUND OF THE INVENTION

1. Field of the Invention

The present invention relates to a transmitter and transmission method employing a multi-carrier transmission technique, particularly a digital wavelet multi-carrier (DWMC) transmission technique utilizing real coefficient wavelet filter banks.

2. Description of the Related Art

Orthogonal frequency division multiplexing (OFDM) is frequently adopted as a conventional multi-carrier transmission method, for example, as described in U.S. Pat. No. 6,442,129. In the OFDM transmission method, discrete Fourier transform (DFT), particularly fast Fourier transform (FFT), is adopted as a modulation/demodulation method. In addition, in FFT-based OFDM, generally speaking, ramp processing is adopted, which makes the time waveform on a leading edge of a frame (preamble) smooth in order to prevent the waveform from distorting in a transmission channel or in hardware such as an amplifier.

Recently, wavelet-based OFDM has been proposed to replace FFT-based OFDM as a modulation/demodulation method in OFDM transmission because FFT-based OFDM has basic weaknesses such as poor resistance to narrow band interference, poor resistance to internal interference, and low transmission efficiency because of the necessity of a cyclic prefix. When ramp processing is performed in wavelet-based OFDM, the length of the preamble data in the wavelet-based OFDM is longer by at least (2k−1) symbols (k is an overlapping factor) than the length of the preamble data in the FFT-based OFDM if the wavelet waveform, as it is, is used as data of the preamble. The greater the length of the preamble data, the more the redundancy of the data increases. Accordingly, the length of the preamble data is required to be as short as possible. While auto gain control (AGC) is performed in a receiver by using a wavelet waveform without ramp processing, convergence speed of the AGC becomes an issue because of the complexity of the wavelet waveform.

SUMMARY OF THE INVENTION

The present invention is made in view of the above-mentioned problems. An object of the present invention is to provide a transmitter and transmission method in the DWMC data transmitting method, which enables shortening of the length of the preamble data and improves the convergence speed of the AGC.

According to the invention, a preamble data generator generates preamble bit data, and outputs the preamble data. Next, a modulator modulates the preamble data, generates a plurality of subcarriers, and outputs a composite wave of the time waves of the plurality of subcarriers. Subsequently, a ramp processor performs ramp processing on the composite wave with a certain delay period from a reference position of the composite wave.

In this way, the invention provides a transmitter and transmitting method which enables shortening of the length of the preamble data and improves the convergence speed of the AGC.

DETAILED DESCRIPTION OF PREFERRED EMBODIMENTS

Preferred embodiments of the invention will be described with reference to FIGS. 1 through 15.

First Embodiment

A first embodiment of the invention generates a digital wavelet multi-carrier (DWMC) transmission signal from a plurality of digitally modulated waves that are received from real-coefficient filter banks. Low bit rate modulation, such as quadrature phase shift keying (QPSK), quadrature amplitude modulation (QAM) or pulse amplitude modulation (PAM), may be used for modulating each carrier.

A data transmission method according to the DWMC transmission method will be described with reference to FIGS. 4 and 10-12.

Figure 10:
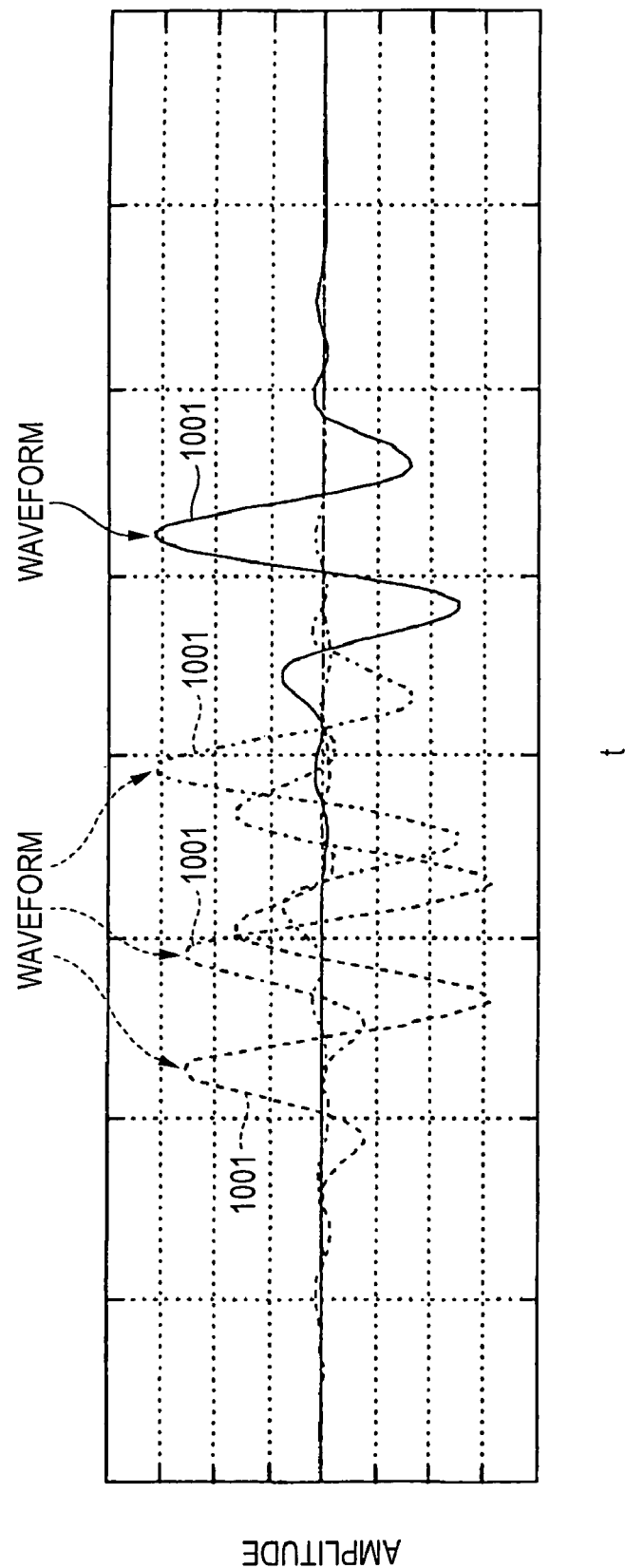
FIG. 10 is a waveform diagram showing a wavelet waveform.
Figure 11:
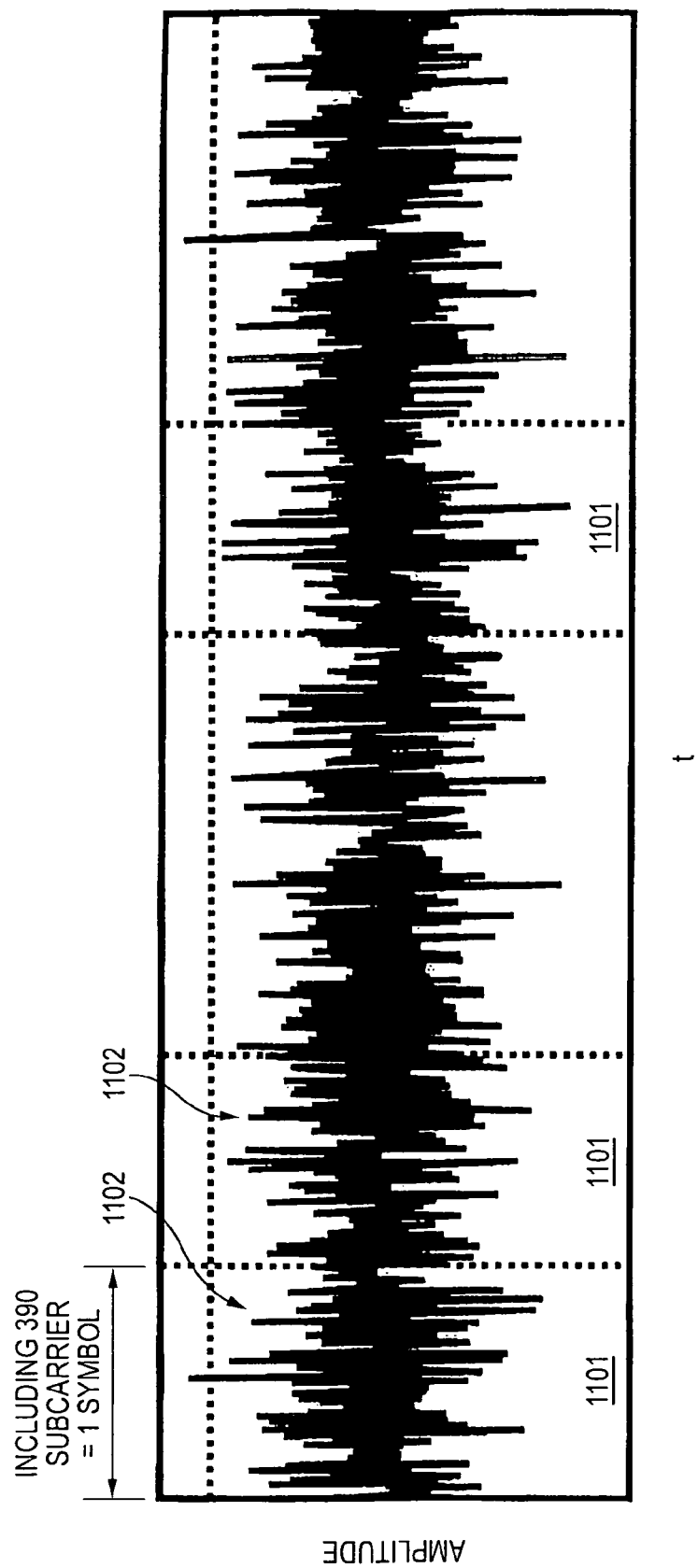
FIG. 11 is a waveform diagram showing an example of a transmitted waveform according to the DWMC transmission method.

FIG. 10 illustrates a waveform of a wavelet, and FIG. 11 illustrates a DWMC transmission waveform according to the invention. As shown in FIG. 10, each waveform 1001 of the wavelet has an impulse response, and impulse responses of each of the plurality of waveforms 1001 are transmitted in an overlapping relationship with each other. As shown in FIG. 11, each transmission symbol 1101 is formed by a time waveform 1102 that is a combination of impulse responses for a plurality of subcarriers.

Figure 12:
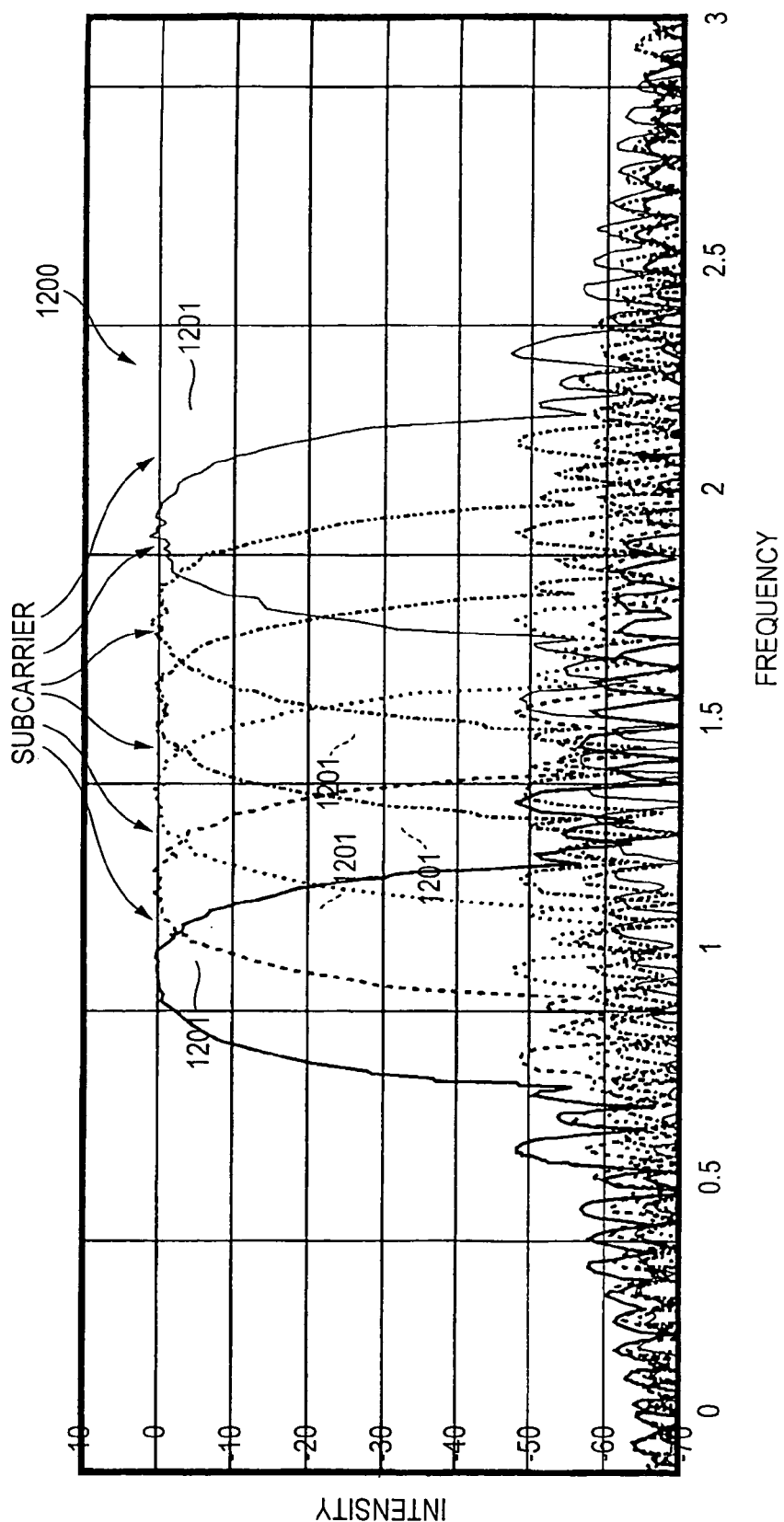
FIG. 12 is a spectrum diagram showing an example of a transmitted spectrum according to the DWMC transmission method.

In FIG. 12, a transmission frame is formed, for example, by several tens to several hundreds of transmission symbols according to the DWMC transmission method. This transmission frame includes a symbol for a transmission of an information data and a preamble data such as a symbol for frame synchronization and a symbol for an equalization. The DWMC transmission signal 1200 includes a plurality of subcarrier signals 1201.

Figure 13:
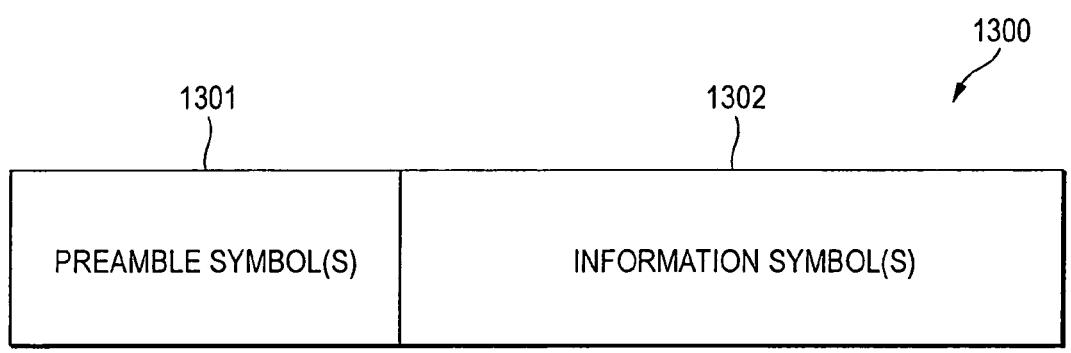
FIG. 13 is a schematic frame diagram showing an example of a configuration of a transmitted frame according to the DWMC transmission method.

FIG. 13 illustrates a configuration of a DWMC transmission frame according to the invention. The DWMC transmission frame 1300 comprises one or more preamble symbols 1301 that are followed by one or more information symbols 1302. The preamble may be used by a receiver for frame synchronization or equalization.

Next, a transmitter 2000 that is preferably for use in the DWMC transmission method will be described with reference to FIGS. 1 to 3.

Figure 1:
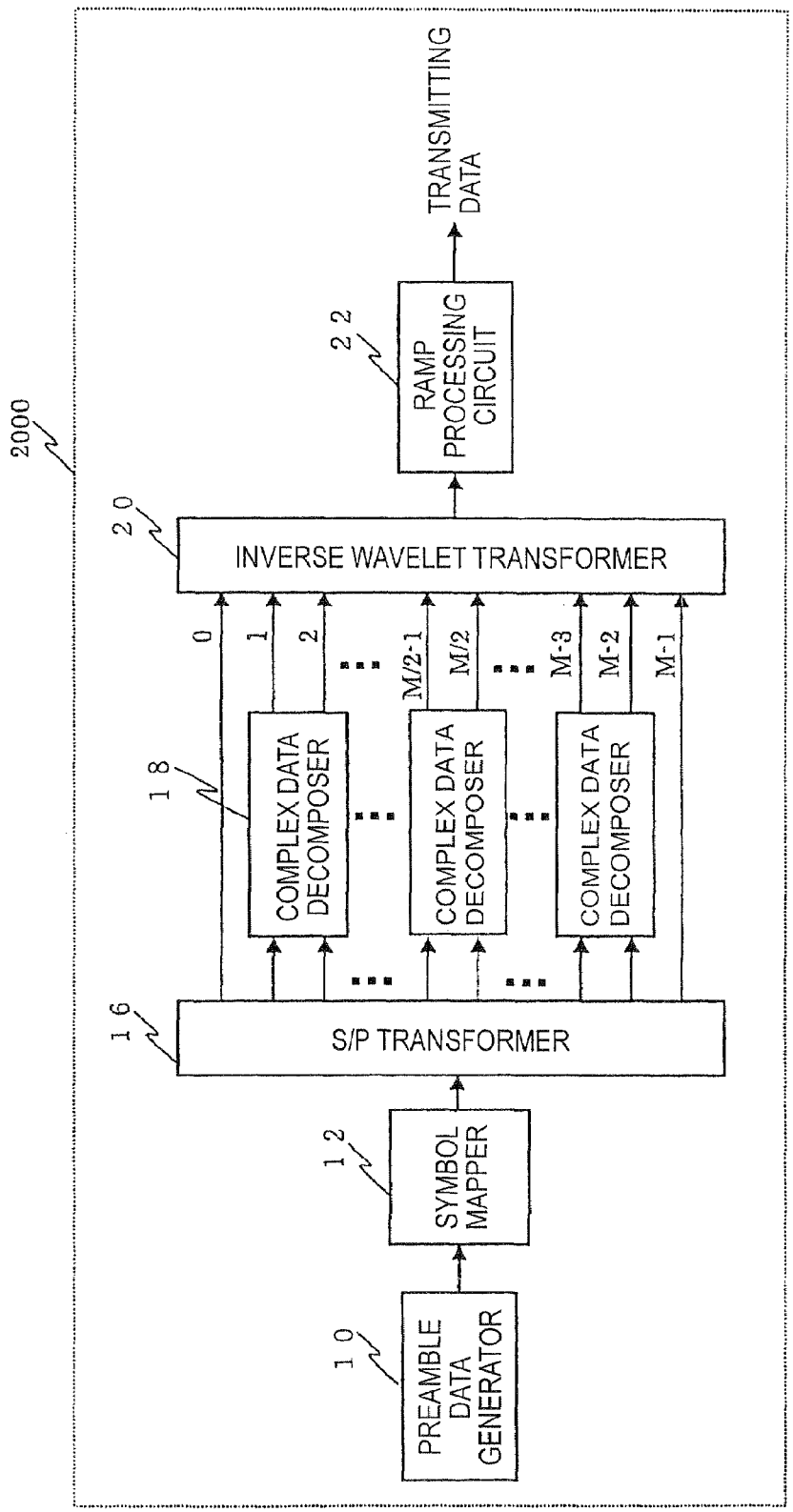
FIG. 1 is a block diagram of a transmitter according to a first embodiment of the invention.

FIG. 1 illustrates a block diagram of a transmitter according to a first embodiment of the invention. A transmitter 2000 includes a preamble data generator 10, a symbol mapper 12, a serial to parallel (S/P) transformer 16, a plurality of complex data decomposers 18, an inverse wavelet transformer 20, and a ramp processing circuit 22, all of which are controlled by a controller (not shown). The operation of transmitter 2000 is described below.

Information data may be input to preamble data generator 10. Preamble data generator 10 generates and outputs preamble data, which is used for carrier detection, synchronization, and/or equalization in a receiver. The preamble data and information data are combined and modulated for representation by symbols. These symbols are produced by: (1) overlapping the preamble and information data and modulating the overlapped data as the actual transmitting data, (2) forming the preamble and information data in a composite configuration and modulating them together, or (3) separately and simultaneously modulating the preamble and information data prior to combining the symbols into a frame.

Symbol mapper 12 transforms bit data of the preamble data and information data into symbol data preferably using a low bit rate modulation method, such as QPSK, QAM, or PAM. Then, symbol mapper 12 maps the symbol data into M/2, where M is the number of subcarriers, complex coordinates and serially outputs the mapped data to S/P transformer 16.

S/P transformer 16 transforms the serially received mapped data into parallel data and outputs all but two of the M parallel data streams to complex decomposers 18. Each complex decomposer 18 decomposes the parallel data it receives into a real part, which is the in-phase component, and an imaginary part, which is the quadrature component. Each complex decomposer 18 outputs to inverse wavelet transformer 20 the in-phase component as (2n−1)th inputted data and the quadrature component as (2n)th inputted data, where $1 \leq n \leq (M/2-1)$, M is a positive integer, and subcarrier number is 0 to M-1. In total inverse wavelet transformer 20 receives M subcarrier waveforms identified in FIG. 1 as subcarriers 0 through M-1. In FIG. 1, the (2n−1) th and (2n) th data inputted to inverse wavelet transformer 20 correspond respectively to subcarriers 1 and 2 for n=1, subcarriers 3 and 4 for n=2, and so on. Both ends of subcarriers, namely subcarriers 0 and M-1 are not used, because these contain much direct current components. Even if used, the end subcarrier is not in orthogonal relationship with the next subcarrier.

Inverse wavelet transformer 20 has M real-coefficient wavelet filters that are orthogonal with respect to each other. Using these wavelet filters, inverse wavelet transformer 20 performs an inverse wavelet transform on both the real and imaginary components it receives. Ramp processing circuit 22 receives the data generated by inverse wavelet transform 20 and ramp processes this data with a delay, which may be equivalent to fraction of a symbol period, one symbol period, or several symbol periods. The ramp processing is accomplished by multiplying data representing a ramp waveform, such as shown in FIG. 3, by the inverse wavelet transformed data, as explained below. Thereafter, the ramp processed data is output by ramp processing circuit 22.

Figure 2:
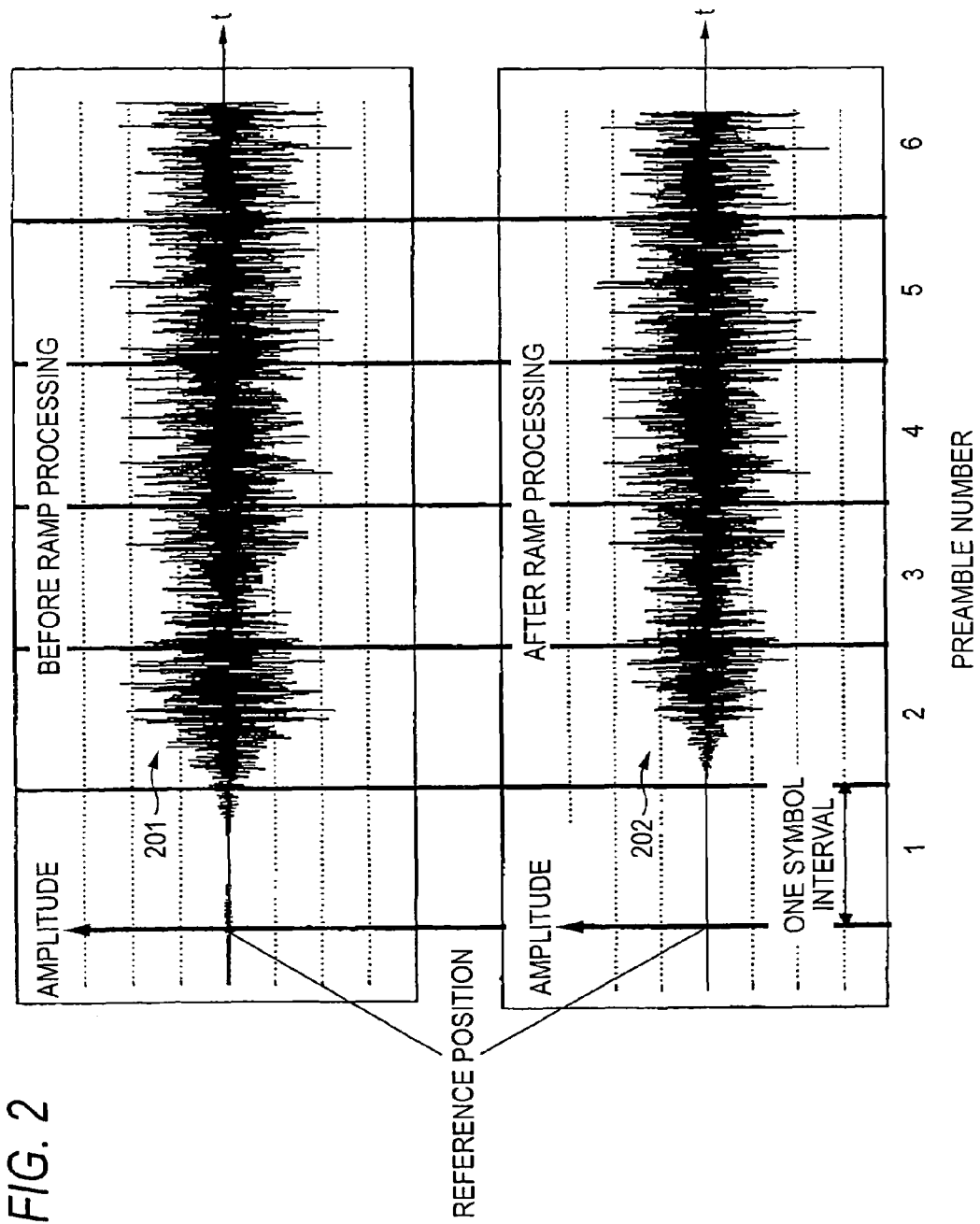
FIG. 2 is a waveform diagram of preamble data according to a first embodiment of the invention.
Figure 3:
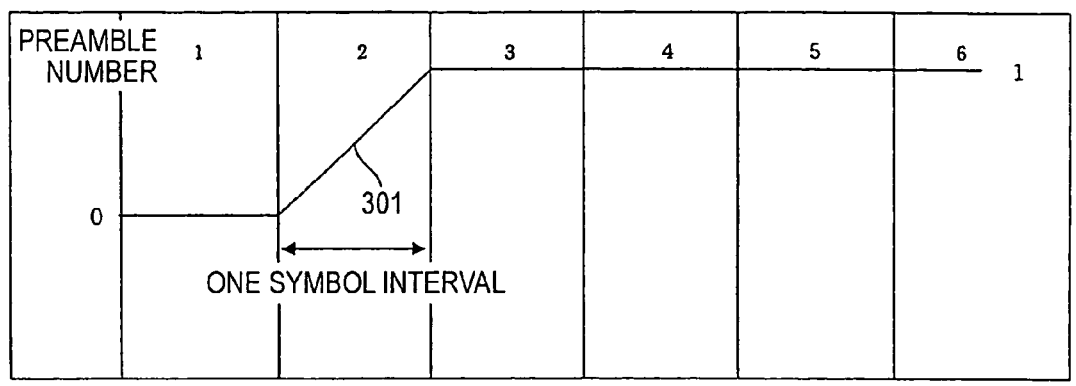
FIG. 3 is a diagram showing an example of ramp processing according to a first embodiment of the invention.

With reference to FIGS. 2 and 3, the ramp processing of the inverse wavelet transform data produced by inverse wavelet transformer 20 will be explained. Particularly, FIG. 2 illustrates a waveform of inverse wavelet-transformed preamble data according to the first embodiment of the invention and FIG. 3 illustrates a ramp processing signal according to the first embodiment of the invention.

In general, since a wavelet time-waveform 201 of the wavelet transformed data localizes and is longer than one symbol length, as shown in FIG. 2, waveform 201 has a moderate initial amplitude rise. Therefore, in many cases, preamble slot 1 includes few effective data for preamble functions.

Ramp processing circuit 22 multiplies inverse wavelet-transform waveform 201, produced by inverse wavelet transformer 20, with ramp waveform 301 to produce a ramp processed product waveform 202. Accordingly, the ramp processing is performed on the wavelet transformed data, which is a composite wave, with a predetermined delay from a reference position of the composite wave as shown in FIG. 2. Waveform 202 of the ramp processed data has zero data for the interval of preamble slot 1. Accordingly, waveform 202 of the ramp processed data substantially has one symbol offset from the rising edge of time waveform 201 of the inverse wavelet transformed data, as shown in FIG. 2.

As illustrated in FIG. 3, ramp processing waveform 301 has a linearly and monotonically increasing value in preamble slot 2 that tends to smooth the amplitude product of this waveform and the waveform produced by inverse wavelet transformer 20. The zero value of waveform 301 in preamble slot 1 effectively eliminates the first symbol of inverse wavelet-transform waveform 201 when waveforms 201 and 301 are multiplied to produce ramp processed waveform 202. Also, the unity value of waveform 301 in preamble slots 3-6 effectively reproduces the symbol waveforms of waveform 201, during preamble periods 3-6, when waveforms 201 and 301 are multiplied to produce ramp processed waveform 202.

Accordingly, the structure of transmitter 2000 substantially shortens the length of the preamble data because a head portion of the preamble data is reduced by one symbol, due to the one-symbol period offset of the ramp processing. Moreover, the structure of transmitter 2000 makes it possible to improve the processing speed of an automatic gain control (AGC) in the receiver because the ramp processing smooths the wavelet waveform.

The first embodiment has been described based on a transmitter 2000 that includes a symbol mapper 12 that performs QAM and complex decomposers 18. However, a symbol mapper performing PAM instead of QAM can be also used in the first embodiment, as shown in FIG. 14.

Figure 14:
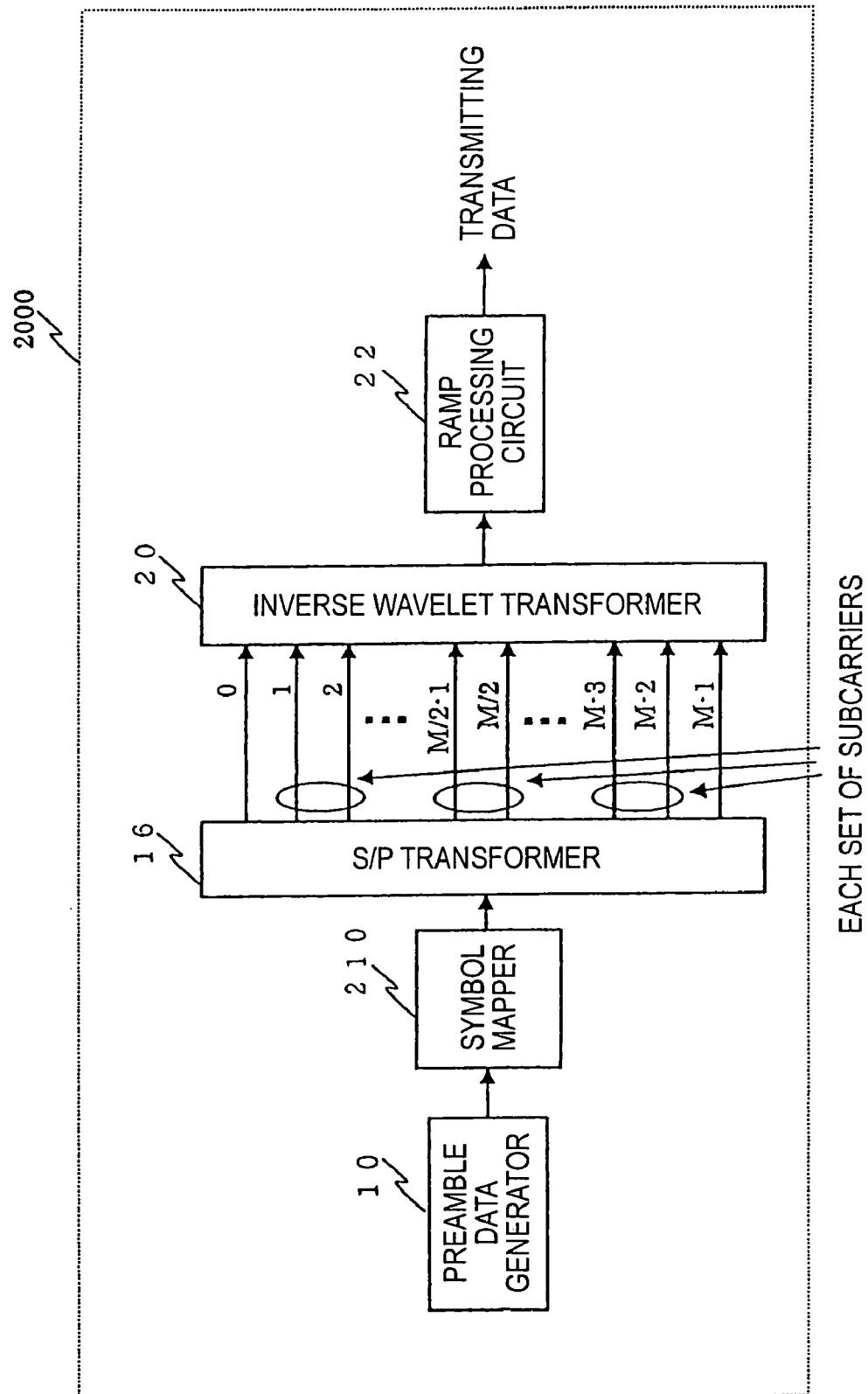
FIG. 14 is a block diagram of another transmitter according to the first embodiment of the invention.

FIG. 14 illustrates a block diagram of another transmitter according to the first embodiment of the invention. In FIG. 14, transmitter 2000 includes a symbol mapper 210 that modulates the preamble data provided by preamble data generator 10 using PAM. Symbol mapper 210 performs almost the same operation as the combined structures of symbol mapper 12 and complex decomposers 18 in FIG. 1, by treating the (2n−1)th and (2n)th subcarriers outputted by S/P transformer 16 as the in-phase and quadrature components, respectively, in inverse wavelet transformer 20.

In the above description of the first embodiment, the symbol interval offset is set for one symbol interval from the rising edge of the time waveform. However, the offset is changeable and can be set for several symbol intervals, as necessary. In addition, the period of the ramp processing is set for one symbol interval in the first embodiment. However, the period is changeable and can be set for several symbol intervals as necessary. Furthermore, a curved waveform such as a raised cosine curve can be employed as the ramp waveform instead of the linear waveform illustrated by FIG. 3. The curved waveform makes it possible to set the period of the ramp processing to less than one symbol interval because the curved waveform will prevent the preamble data from increasing transmission side lobes when the curved waveform and the preamble data are multiplied together by ramp processing circuit 22.

Second Embodiment

A transmitter of the second embodiment basically has the same configuration as the transmitter of the first embodiment. However, the ramp processing is different from that employed in the transmitter of the first embodiment. This difference will be described in detail with reference to FIGS. 1, 3-5, and 16.

In the present embodiment, preamble data generator 10 normally outputs serial data having values of "0" until instructed by the controller to output preamble data. When the instruction is received to output preamble data, preamble data generator 10 serially generates a value, such as "1," over several symbol periods so that each subcarrier produced by S/P transformer 16 contains a series of this value as its preamble data.

Figure 9:
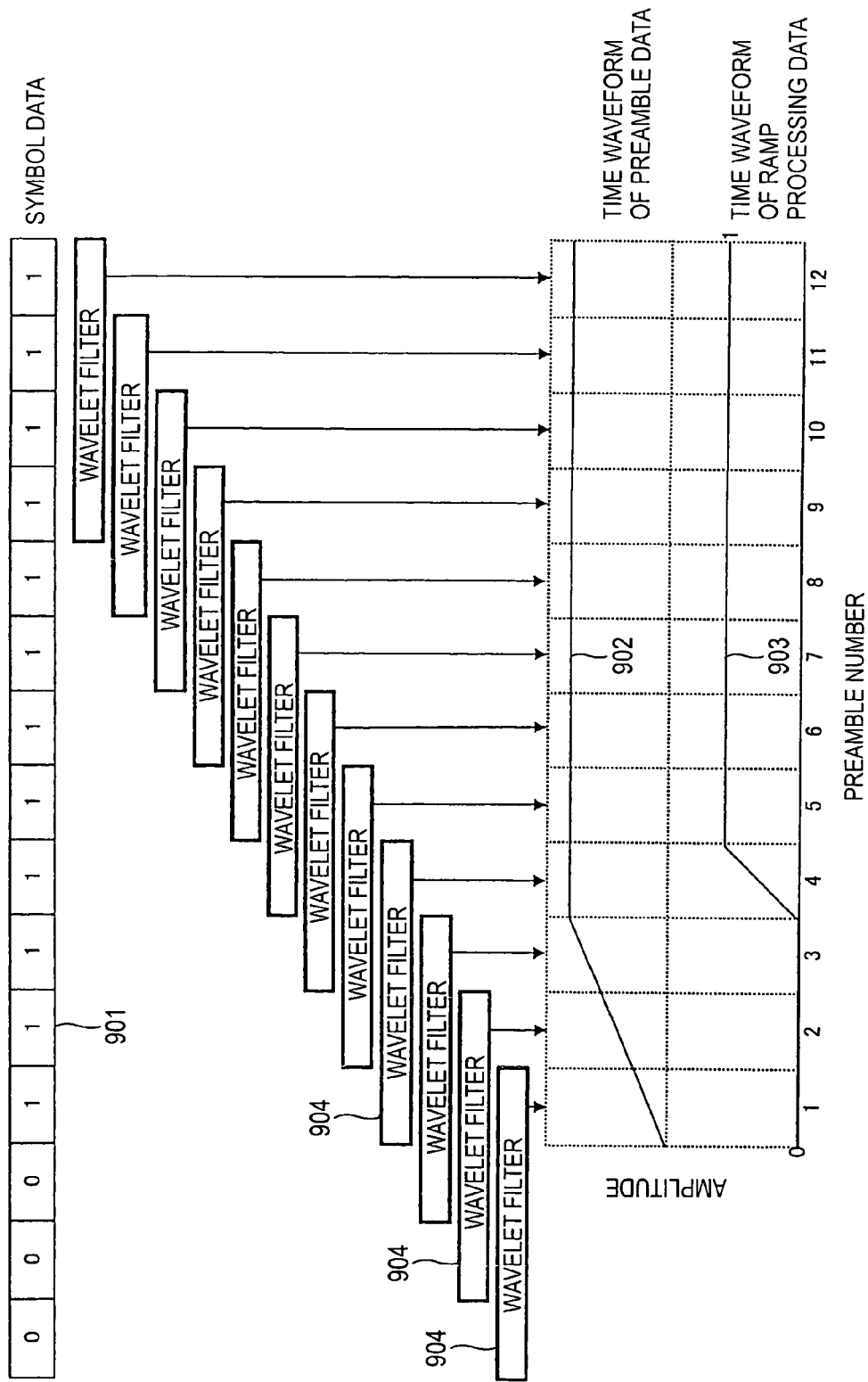
FIG. 9 is a schematic diagram showing a relationship among symbol data of preamble data, time waveform of preamble data, and ramp processing waveform.

FIG. 9 illustrates a relationship among symbol data 901 of the Preamble data, a time waveform 902 of the preamble data, and a ramp processing waveform 903 used for generating a DWMC transmission signal according to the invention. In FIG. 9, the same symbol data value of "1" is illustrated as being output by preamble data generator 10 for a period of time beginning with the fourth preamble period so as to provide each subcarrier produced by S/P transformer 16 with a series of "1" values in its preamble data.

In the present embodiment, inverse wavelet-transformer 20 includes a wavelet filter 904 having a four-symbol interval length. Accordingly, a time waveform value of the preamble data for preamble slot 1 is generated from the first four preamble symbol data values (0, 0, 0, 1), which are inputted to wavelet filter 904. Next, a time waveform value of the preamble symbol data for preamble slot 2 is generated from the next group of four preamble symbol data values (0, 0, 1, 1) in the series of symbol data, which is inputted to wavelet filter 904. According to this waveform generation process, each subsequent group of four data values includes a fourth data value in the sequence of preamble symbol data and the three preceding data values of the preamble symbol data, which were included in the previous group of four data values. By repeatedly producing waveform values in this way, a time waveform 902 of the preamble data can be obtained, as shown in FIG. 9.

Figure 4:
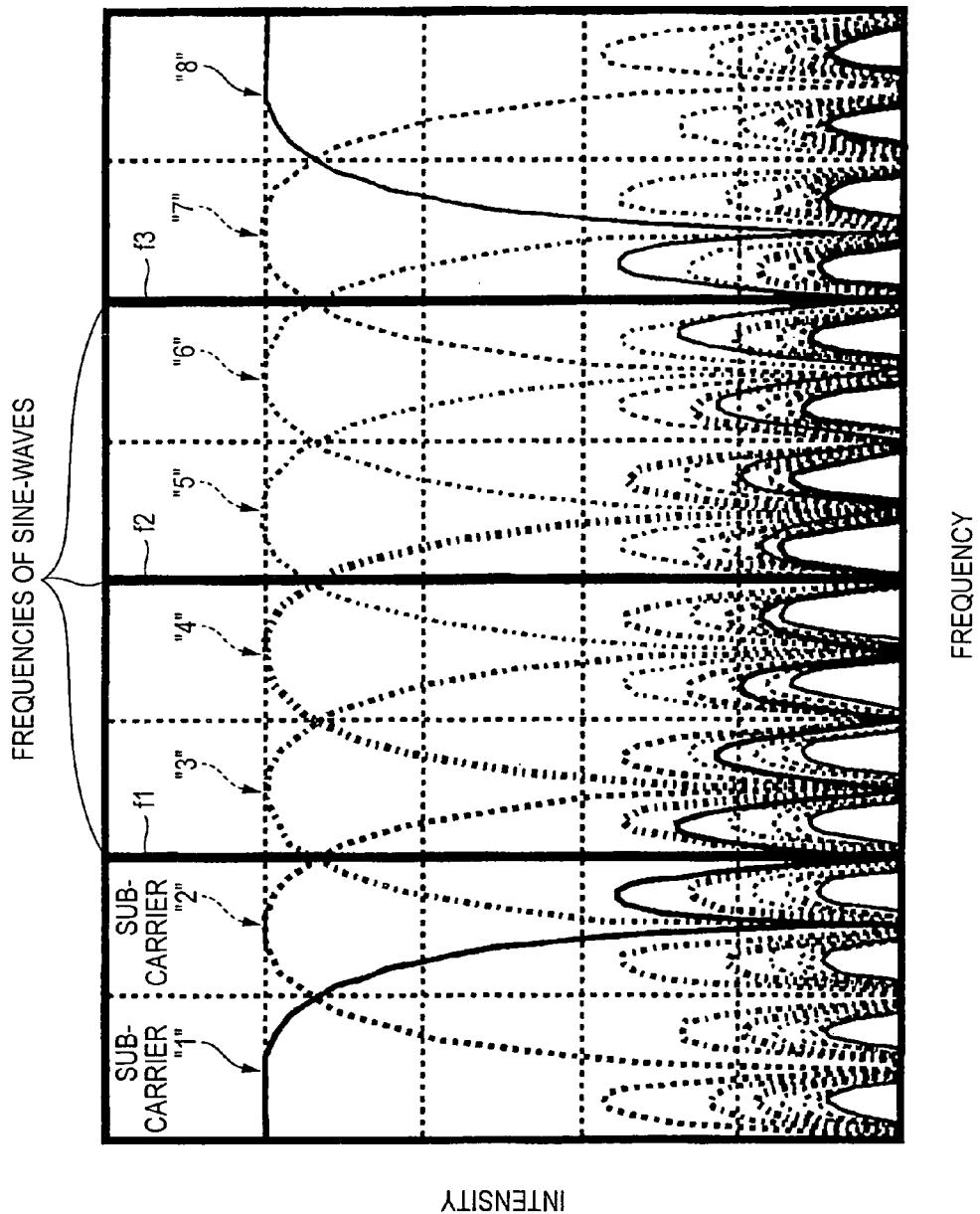
FIG. 4 is a spectrum diagram showing a relationship between subcarrier numbers and frequencies of sine waves.

FIG. 4 illustrates the spectrum of a DWMC multi-carrier transmission signal, and the relationship between subcarrier numbers and frequencies of sine waves. For the purpose of simplifying the explanation, it is assumed that there are eight subcarriers in the present embodiment, as shown in FIG. 4. The output of the transmitter 2000 is a composite of three sine waves that have frequencies of f1, f2, and f3, respectively, as shown by the solid heavy lines in FIG. 4. The three sine waves have phases, $\phi 1$, $\phi 2$, and $\phi 3$, respectively. Each of the phases, $\phi 1$, $\phi 2$, and $\phi 3$, can take any value ranging from $-\pi$ to $\pi$.

Referring now to FIG. 1, the operation of transmitter 2000 in accordance with the second embodiment of the invention will be described in greater detail. First, symbol mapper 12 transforms a bit value of the preamble data into symbol data by using QAM and maps the symbol data into M/2 complex coordinates. The mapped complex data of "exp(j$\phi$n)" can be obtained by the operation of the symbol mapper 12. Next, S/P transformer 16 transforms the serially inputted mapped complex data into parallel data and outputs M-2 of the parallel complex data streams to complex decomposers 18. Each complex decomposer 18 decomposes the parallel data it receives into a real part (cos($\phi$n)) and an imaginary part (sin($\phi$)). Subsequently, each complex decomposer 18 allots "cos ($\phi$n)" and "sin($\phi$n)" to the (2n−1)th and (2n)th subcarrier inputs, respectively, provided to inverse wavelet transformer 20. The output from inverse wavelet transformer 20 is the composite wave of the sine waves of "cos(2$\pi$fn·t+$\phi$n)", where "fn" is a frequency of the n-th sine wave and "$\phi$n" is a phase of the n-th sine wave.

Figure 5:
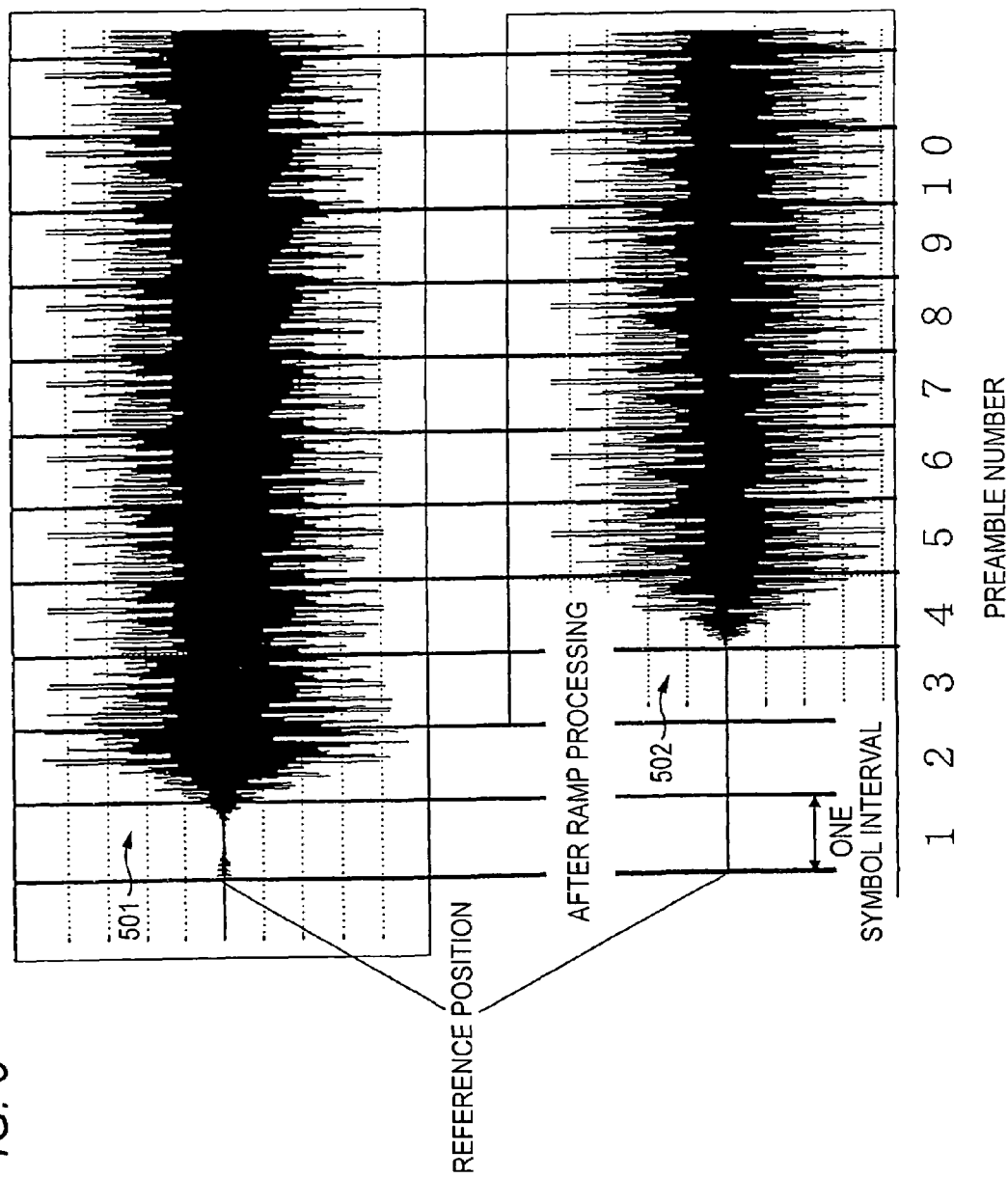
FIG. 5 is a waveform diagram of preamble data according to a second embodiment of the invention.

FIG. 5 illustrates a waveform of preamble data according to a second embodiment of the invention. A waveform 501 is produced from preamble data comprising the same data value, such as "1", output by preamble data generator 10 for a series of sequential symbol periods. The wavelet filter length used to produce waveform 501 is determined from the expression X=2kN, where N is the symbol length and, generally, N=M, when k (overlapping factor) is equal to "2". In FIG. 5, the real composite wave 501 is a proper sine waveform in preamble No. 4 (i.e. it corresponds closely to a true sine wave), the ramp processing is carried out from the preamble No. 4 using the ramp form of FIG. 3 (i.e., using ramp form 903 of FIG. 9). In other words, waveform 502 illustrates composite waveform 501 after it has been ramp processed by ramp processing circuit 22. The ramp processing effectively multiplies composite waveform 501 by time waveform 903 of the ramp processing data of FIG. 9.

The above-described structure of the second embodiment makes it possible to substantially shorten the preamble length, since the frame-head portion of the preamble data can be substantially deleted. It is preferable to substantially delete (X-1) symbol length as the deleted frame-head position. Where, "X" means the filter length determined by the expression X=2kN. Furthermore, the above-mentioned configuration makes it possible to improve the accuracy of the modulation relative to that of the transmitter described in the first embodiment, since almost the entire range of the preamble data is a composite waveform consisting of proper sine waves. Furthermore, because initial phases mapped on the complex coordinates by the symbol mapper can be voluntarily provided to each of the (2n−1)th and (2n)th subcarriers, the above-mentioned configuration makes it possible to reduce the instantaneous power consumption peak when the phases of the subcarriers are set to eliminate an overlap with each other.

Alternative ways of inserting preamble symbols 1301 into the head portion of frame 1300, illustrated by FIG. 13, may be used as well. For example, a time waveform of the preamble data without the frame-head portion may be preliminarily created and stored in a memory (not shown), assuming the same preamble data waveform can always be used. When a need arises, the stored waveform can be inserted into the rising edge of the time waveform of the information data to produce the composite time waveform of the frame. Also, the number of symbols deleted from the preamble data by the ramp processing may be regulated in accordance with the number of "0" values serially occurring in the preamble data before the series of "1" values is begun.

A symbol mapper 210 performing PAM instead of QAM can be also used in the present embodiment, like the first embodiment.

In addition, as described previously for the present embodiment, preamble data generator 10 generates the preamble data by outputting the same data value (for example "1") to each subcarrier for a sequence of serial symbol intervals. As the sequence of serial symbol intervals is lengthened, the present embodiment becomes more effective. Alternatively, the period of ramp processing can be set for less than one symbol interval.

Third Embodiment

A transmitter of the third embodiment has basically the same configuration as the transmitter of the first embodiment. However, the configuration of the inverse wavelet transformer 20 will be described in greater detail here, with reference to FIGS. 6-8.

Figure 6:
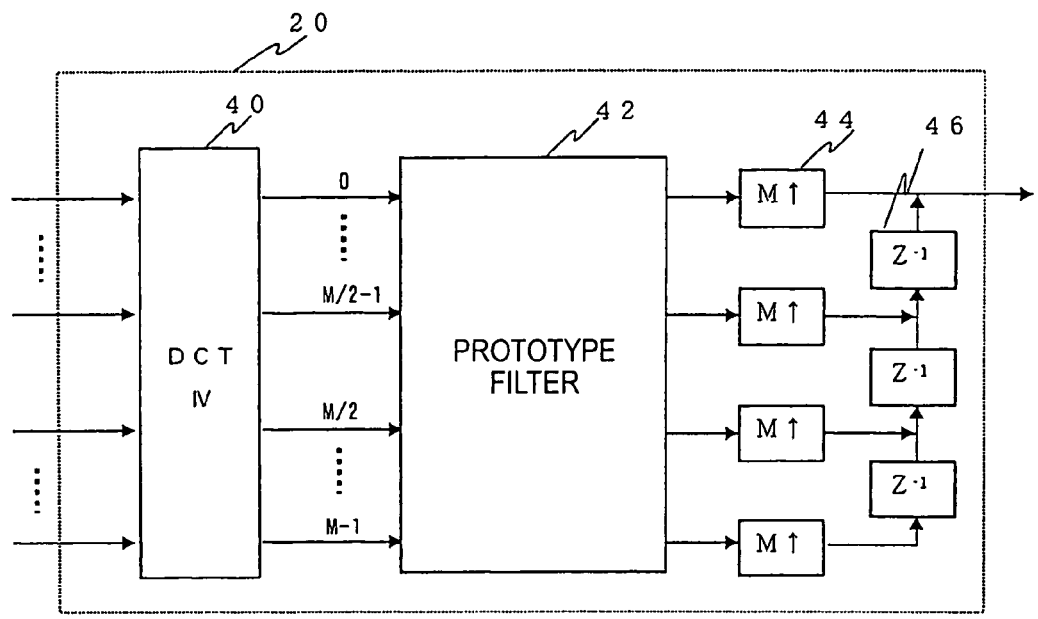
FIG. 6 is a block diagram of an inverse wavelet transformer in a transmitter according to a third embodiment of the invention.

FIG. 6 illustrates a block diagram of an inverse wavelet transformer in a transmitter according to a third embodiment of the invention. Inverse wavelet transformer 20 includes a fast discrete cosine transformer (type 4)40, a prototype filter 42, M up-samplers 44, and M-1 delays 46. Up-samplers 44 multiply the sampling rate of the transmitted waveform by M, and delays 46 delay the transmitted waveform.

Figure 7:
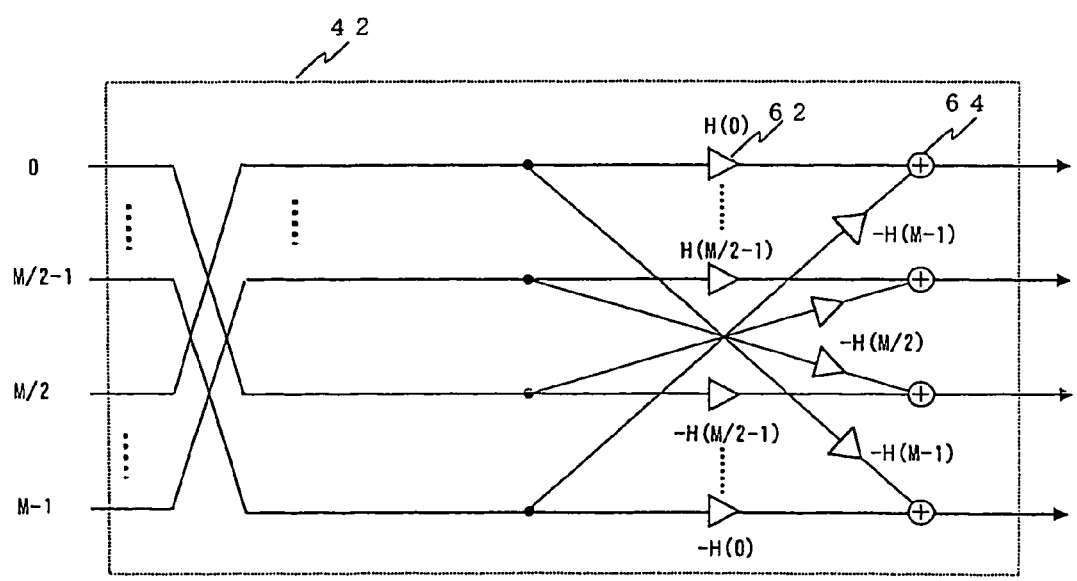
FIG. 7 is a block diagram of a prototype filter of an inverse wavelet transformer in a transmitter according to the third embodiment of the invention.

FIG. 7 illustrates a block diagram of a prototype filter 42 of the inverse wavelet transformer according to the third embodiment of the invention. Prototype filter 42 is a polyphase filter that includes multipliers 62, which hold prototype filter coefficients, and adders 64. A general configuration of a polyphase filter is described in "Signal Processing With Lapped Transform" by Henrique S. Malvar. The order of the prototype filter 42 is 2M in the present embodiment.

An operation of the transmitter that has an above-mentioned configuration will now be described. The parallel data outputted from S/P transformer 16 are received by fast discrete cosine transformer (DCT) 40 in inverse wavelet transformer 20. Fast DCT 40 performs a DCT transform on the received data and outputs the DCT transformed data to prototype filter 42. Prototype filter 42 filters the DCT transformed data and produces outputs of filtered data. Each up-sampler 44 performs an up-sampling on a respective one of the filtered data outputs and outputs up-sampling data. Finally, the up-sampling data are combined, with the cooperation of delays 46, to transform the parallel data into serial data and the serial data are outputted as transmitting data. In the present embodiment, the modulation is performed though the cooperation of prototype filter 42 and fast DCT 40.

Figure 8:
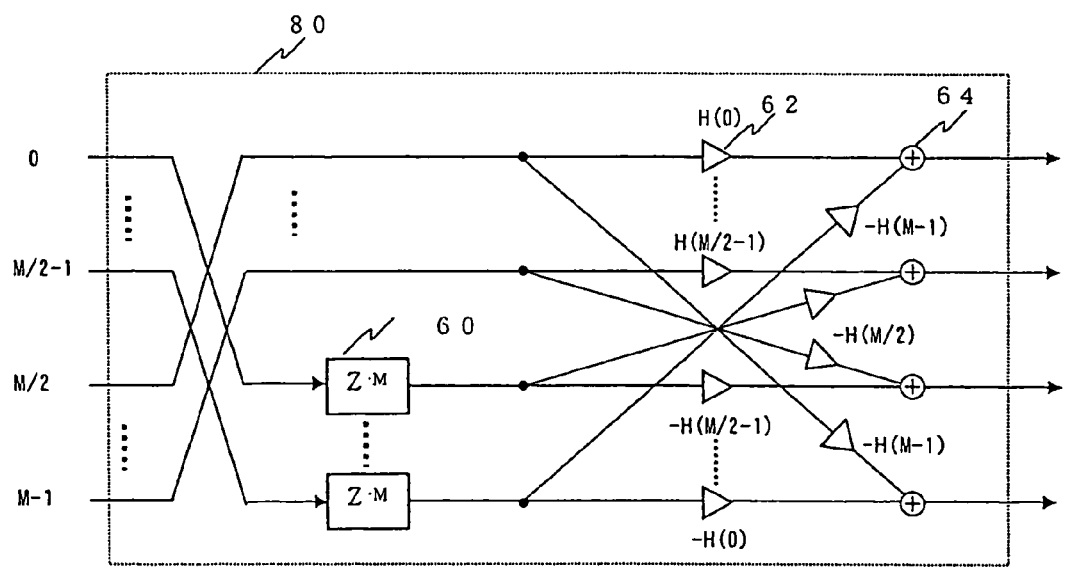
FIG. 8 is a block diagram of another prototype filter of an inverse wavelet transformer in a transmitter according to the third embodiment of the invention.

FIG. 8 illustrates a block diagram of another prototype filter of the inverse wavelet transformer according to the third embodiment of the invention. Prototype filter 80 has basically the same configuration as prototype filter 42 but includes delays 60 for delaying received data by one symbol period. The one symbol period is equal to M sampling periods in the present embodiment. Prototype filter 80 does not process preamble data but, instead, processes information data. Since the configuration of prototype filter 42 has nearly the same configuration as filter 80, a single device similar to that of prototype filter 80 having switchable bypass circuits around delays 60 may be used to process both the preamble data and information data, thereby reducing the amount of circuitry relative to a transmitter having both prototype filters 42 and 80. Prototype filter 42 has no delay devices 60, as does prototype filter 80. Therefore, prototype filter 42 induces less latency in the outputted data than does prototype filter 80. Furthermore, while the order of the prototype filter 42 is 2M (this means k=1) in the present embodiment, the time latency can be reduced when the order of the prototype filter 42 is 2kM.

Although a fast DCT is used in the inverse wavelet transformer of the third embodiment, the same processing will be achieved when a fast discrete sine transformer (DST) is used instead of the fast DCT. The fast DST and fast DCT have basically the same configuration, though a filter coefficient differs between the two. The first through third embodiments should not be construed as limiting, but rather merely illustrating, the invention. The DWMC wavelet waveform transmitter described herein can be used in many applications where a general digital multi-carrier transmitter is appropriate, such as situations requiring a waveform localized in the time and frequency domains.

For each of the first to third embodiments, it is preferable to perform the ramp processing for one symbol interval or more so as to suppress distortion in the wavelet waveform and prevent the increase of side lobes in the amplitude spectrum of the wavelet waveform.

While the invention may be applied to a wide variety of communication apparatuses for transmitting and receiving signals, it is especially suitable for power line communication (PLC) systems that may communicate information across a poor transmission path. Deregulation is in progress to allow the use of the band from 2 MHz to 30 MHz for PLC. However, other existing systems(e.g., amateur radios and shortwave broadcasts) use the same band. Since no interference with other existing systems is allowed, ideally, no PLC signals should be transmitted to the portions of the band used by other existing systems.

Normally, a notch filter is used to reduce the amplitude of signals communicated in the portions of the band used by existing systems. A notch filter providing 30 dB of attenuation is used in HOMEPLUG 1.0 released by HOMEPLUG, which is an alliance of PLC businesses in the United States. Thus, a possible target for the suppression of interference to other existing systems is 30 dB or more.

With a DWMC transmission method, a filter bank is used to limit the band of each subcarrier, so as to suppress subcarrier signals that overlap the portion of the band used by existing systems. Therefore, the DWMC transmission method can achieve a similar attenuation of undesirable signals to that achieved by a conventional notch filter. The deeper the attenuation provided by a filter of DWMC transmitter 2000, the greater the filter length of each of the M filters of the filter bank and the greater the delay attributable to the filters, since filter delay is a trade-off for the attenuation depth. However it is possible to form attenuation notches of 30 dB or more and suppress the filter delay by limiting the filter length of a PLC filter bank to 4N, using transmitter 2000.

Figure 15:
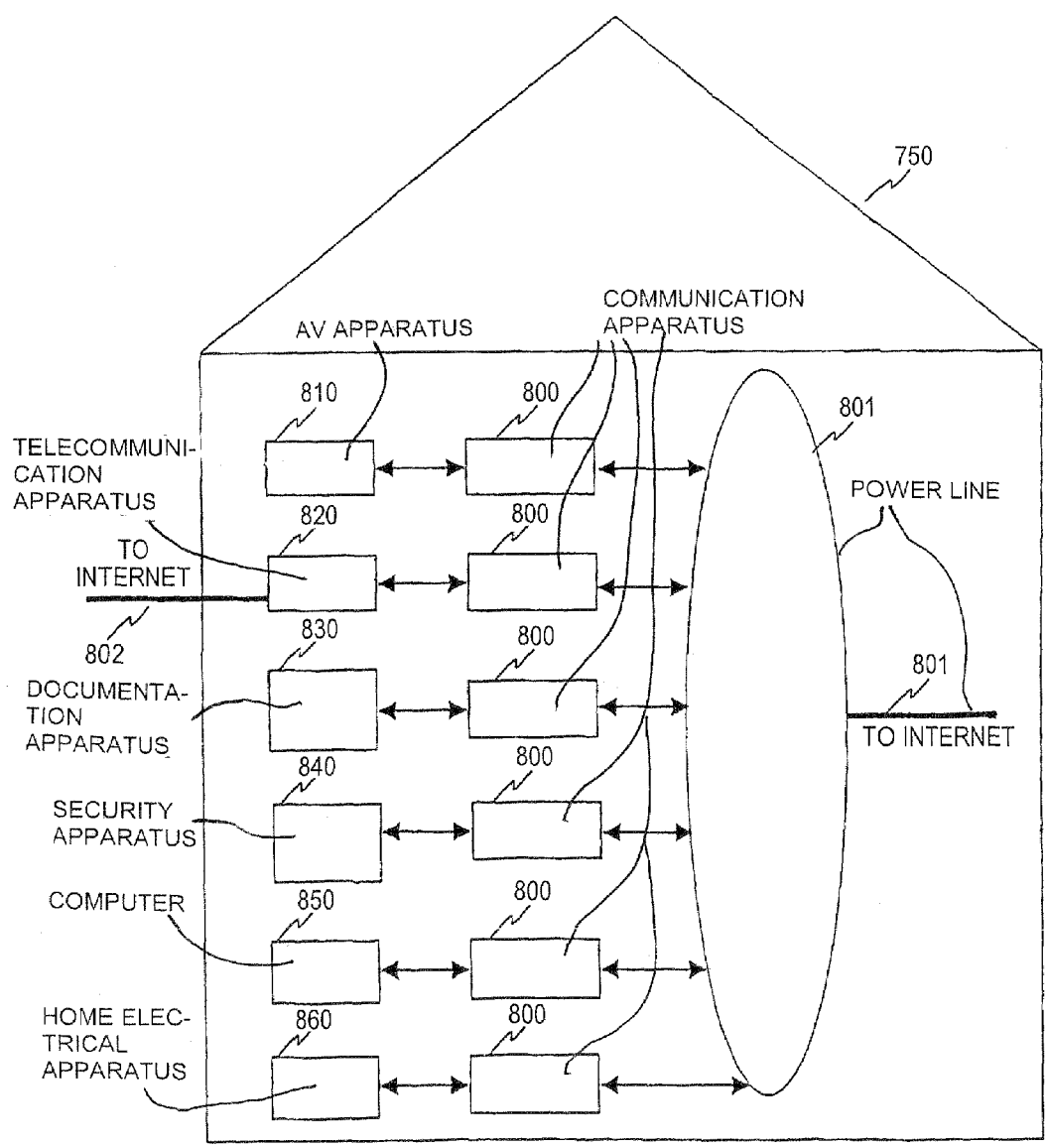
FIG. 15 is a block diagram of a power line communication system.

FIG. 15 illustrates a block diagram of a power line communication system according to the invention. As shown in FIG. 15, a PLC system in a building 750 includes a power line 801; a conventional network 802, such as a telephone network, an optical network, or a cable television (CATV)network; a communication apparatus 800 including both transmitter 2000, as described in the first to third embodiments, and a receiver (not shown); an audio-visual (AV) apparatus 810, such as a television set, a video device, a digital video disk (DVD) recorder or player, or a DV camera; a telecommunication apparatus 820, such as a router, an asymmetric digital subscriber line (ADSL), a very high bit-rate digital subscriber line (VDSL), a media converter, or a telephone; a documentation apparatus 830, such as a printer, a facsimile, or a scanner; a security apparatus 840, such as a camera or an interphone; a computer 850; and a home electrical apparatus 860, such as an air conditioner, a refrigerator, a washing machine, or a microwave oven.

An operation of the PLC system will now be described. Devices 810-860 form a network in cooperation with power line 801 and perform bi-directional communication using communication apparatuses 800. For Internet communication, a connection may be made to the Internet via a home gateway provided in the building 750 through power line 801. Alternatively, a connection may be made via telecommunication apparatus 820 to communicate over conventional network 802. Additionally, a connection may be made on a wireless basis from a telecommunication apparatus 820 having a radio function. Since communication apparatus 800 performs modulation and demodulation processes using filter banks involving M filters, which are orthogonal with respect to each other, the interference with the other existing systems can be suppressed by disabling subcarriers that overlap the band used by the other existing systems. Further, since the filter length can be limited to 4N, delays attributable to the filters can be reduced while achieving an attenuation notch depth of 30 dB or more. Also, the effect of narrow band interferences from the other existing systems can be reduced.

Furthermore, when a notch is to be generated in a certain band, transmitter 2000 may effectively accomplish this by disabling any subcarrier that overlaps the band. It is therefore possible to comply with regulations in various countries easily and with flexibility. Even when there is a regulation change after the present system is put in use, the change can be accommodated with flexibility, for example by upgrading the firmware of transmitter 2000.

In addition, the configurations of the first to third embodiments can be combined with each other as needed.

Furthermore, an IC (integrated circuit) chip is used as the preamble data generator 10, the symbol mappers 12 and 112, the serial to parallel (S/P) transformer 16, the complex data decomposer 18, the inverse wavelet transformer 20, and the ramp processing circuit 22 of the transmitter 2000. A FPGA (field programmable gate-array) or an ASIC (application specific integrated circuit) is preferably used as the IC chip. Furthermore, it may be possible to use a plurality of IC chips for the functional blocks such as the preamble data generator 10, the symbol-mappers 12 and 112, the serial to parallel (S/P) transformer 16, the complex data decomposer 18, the inverse wavelet transformer 20, and the ramp processing circuit 22 of the transmitter 2000.

This application is based upon Japanese Patent Application NO. 2003-190953 filed on Jul. 3, 2003, the entire technical contents of which are incorporated herein by reference in its entirety.

What is claimed is:

1. A transmitter employing a digital wavelet multi-carrier modulation, said transmitter comprising:
   a preamble data generator that generates preamble data and outputs the preamble data;
   a modulator that modulates the preamble data, generates a plurality of subcarriers, and outputs a composite wave of time waves of the plurality of subcarriers; and
   a ramp processor that performs ramp processing on the composite wave by multiplying the composite wave with a ramp function comprising a first portion having a zero value and a second portion that ramps up from said first portion, wherein said second portion begins at a predetermined delay from a reference position of the composite wave in a manner such that the length of the composite wave is shortened.

2. The transmitter according to claim 1, wherein said predetermined delay is one symbol interval delay or less from the reference position of the composite wave.

3. The transmitter according to claim 1, wherein said predetermined delay is more than one symbol interval delay from the reference position of the composite wave.

4. The transmitter according to claim 1, wherein the composite wave localizes in time and frequency domain.

5. The transmitter according to claim 1 wherein the modulator comprises:
   a symbol mapper that transforms the preamble data to symbol data; and
   an inverse wavelet transformer that performs an inverse wavelet transform of the symbol data, generates a plurality of subcarriers, and outputs a composite wave of time waves of the plurality of subcarriers.

6. The transmitter according to claim 5, wherein said preamble data generator generates the preamble data by giving, for each subcarrier, the same bit value in a series of symbol intervals.

7. The transmitter according to claim 5, wherein said ramp processor performs the ramp processing to the preamble data from the first symbol interval having a proper sine wave.

8. The transmitter according to claim 5, wherein said ramp processor performs the ramp processing for one symbol interval or more.

9. The transmitter according to claim 8 wherein said ramp processor performs the ramp processing to the preamble data from the first symbol interval having a proper sine wave.

10. The transmitter according to claim 5 wherein:
    said symbol mapper further maps the symbol data into complex coordinates and outputs mapped data,
    said modulator comprises both a serial-to-parallel transformer that transforms the mapped data inputted serially into parallel data and a complex decomposer that decomposes the parallel data into in-phase component and quadrature component and outputs both the in-phase component and the quadrature component, and
    said inverse wavelet transformer further comprises M real coefficient wavelet filters which are orthogonal with respect to each other (M being a positive integer) and that receives the in-phase and quadrature component as (2n−1)th and (2n)th inputted data, respectively, and performs a wavelet transform of the inputted data.

11. The transmitter according to claim 10, wherein said inverse wavelet-transformer further comprises:
    a fast discrete cosine transformer that performs a cosine transform on the inputted data to produce transformed data;
    a prototype filter that comprises a real coefficient polyphase filter, an adder, and a multiplier, and that filters the transformed data to produce filtered data;
    M up-samplers that perform an up-sampling on the filtered data to produce up-sampled data; and
    M-1 delays that delay the up-sampled-data by a certain period.

12. The transmitter according to claim 5 wherein:
    said symbol mapper further maps the symbol data into M/2 complex coordinates, where M is the number of subcarriers,
    said modulator comprises a serial-to-parallel transformer that serially receives the mapped symbol data and transforms the mapped symbol data into parallel data and a complex decomposer that decomposes the parallel data into real and imaginary parts, and said inverse wavelet transformer comprises M real-coefficient orthogonal wavelet filters that cooperate to inverse wavelet transform both the real and imaginary parts into the composite wave.

13. The transmitter according to claim 1, wherein the modulator comprises:

a symbol mapper that modulates the preamble data to produce symbol data and maps the symbol data into M/2 complex coordinates, where M is the number of subcarriers;

a serial-to-parallel transformer that serially receives the mapped symbol data and transforms the mapped symbol data into parallel data; and an inverse wavelet transformer comprising M real-coefficient orthogonal wavelet filters that cooperate to decompose the parallel data into real and imaginary parts and inverse wavelet transform both the real and imaginary parts into the composite wave.

14. The transmitter according to claim 13, wherein the inverse wavelet transformer comprises:

a transformer comprising one of a discrete cosine transformer (DCT) and a discrete sine transformer (DST) that DCT or DST transforms the real and imaginary parts to produce transformed data;

up-samplers that each up-sample components of the transformed data after the components of the transformed data are each respectively filtered by a separate one of the M real-coefficient orthogonal wavelet filters; and a combining device that combines all of the up-sampled components into the composite wave.

15. The transmitter according to claim 13, wherein the M real-coefficient orthogonal wavelet filters cooperate as a polyphase filter with an order of 2M.

16. The transmitter according to claim 13, wherein the M real-coefficient orthogonal wavelet filters cooperate as a polyphase filter with an order greater than 2M.

17. The transmitter according to claim 13, wherein the M real-coefficient orthogonal wavelet filters comprise:

filter banks of a length four times the symbol length that cooperate as a polyphase filter; And the coefficient values of the M filter banks are selectively controllable to attenuate spectral components of the composite wave falling within a frequency range by 30 decibels.

18. The transmitter according to claim 1, wherein the ramp processing comprises combining the composite wave with a linearly and monotonically increasing waveform to produce a smoothed waveform.

19. The transmitter according to claim 1, wherein the ramp processing comprises combining the composite wave with a raised cosine waveform to produce a smoothed waveform, 20. The transmitter according to claim 1, wherein the composite wave has a rising edge and the reference position is where the rising edge appears.

21. A transmitter employing digital wavelet multi-carrier modulation, said transmitter comprising:

a preamble data generating means for generating preamble data, and for outputting the preamble data;

a modulating means for modulating the preamble data, for generating a plurality of subcarriers, and for outputting a composite wave of the time waves of the plurality of subcarriers; and a ramp processing means for performing ramp processing on the composite wave by multiplying the composite wave with a ramp function comprising a first portion having a zero value and a second portion that ramps up from said first portion, wherein said second portion begins at a predetermined delay from a reference position of the composite wave in a manner such that the length of the composite wave is shortened.

22. A transmitting method employing digital wavelet multi-carrier modulation, said transmitting method comprising:

generating preamble data and outputting the preamble data;

modulating the preamble data, generating a plurality of subcarriers, and outputting a composite wave of the time waves of the plurality of subcarriers; and performing ramp processing on the composite wave by multiplying the composite wave with a ramp function comprising a first portion having a zero value and a second portion that ramps up from said first portion, wherein said second portion begins at a predetermined delay from reference position of the composite wave in a manner such that the length of the composite wave is shortened.

23. A transmitter employing a digital wavelet multi-carrier modulation, said transmitter comprising:

a preamble data generator that generates preamble data and outputs the preamble data;

a modulator that modulates the preamble data, generates a plurality of subcarriers, and outputs a composite wave of time waves of the plurality of subcarriers, said composite wave having a first length; and a ramp processor that performs ramp processing on the composite wave by multiplying the composite wave with a ramp function comprising a first portion having a zero value and a second portion that ramps up from said first portion, wherein said second portion begins at a predetermined delay from a reference position of the composite wave such that the length of the composite wave is changed to have a second length shorter than said first length.

24. A transmitter employing digital wavelet multi-carrier modulation, said transmitter comprising:

a preamble data generating means for generating preamble data, and for outputting the preamble data;

a modulating means for modulating the preamble data, for generating a plurality of subcarriers, and for outputting a composite wave of the time waves of the plurality of subcarriers, said composite wave having a first length; and a ramp processing means for performing ramp processing on the composite wave by multiplying the composite wave with a ramp function comprising a first portion having a zero value and a second portion that ramps up from said first portion, wherein said second portion begins at a predetermined delay from a reference position of the composite wave such that the length of the composite wave is changed to have a second length shorter than said first length.

25. A transmitting method employing digital wavelet multi-carrier modulation, said transmitting method comprising:

generating preamble data and outputting the preamble data;

modulating the preamble data, generating a plurality of subcarriers, and outputting a composite wave of the time waves of the plurality of subcarriers, said composite wave having a first length; and performing ramp processing on the composite wave by multiplying the composite wave with a ramp function comprising a first portion having a zero value and a second portion that ramps up from said first portion, wherein said second portion begins at a predetermined delay from a reference position of the composite wave such that the length of the composite wave is changed to have a second length shorter than said first length.

* * * * *